United States Patent [19]

Smith

[11] Patent Number: 5,384,086
[45] Date of Patent: Jan. 24, 1995

[54] LINING OF PIPELINES OR PASSAGEWAYS

[75] Inventor: Edward P. Smith, Ravensthorpe, Great Britain

[73] Assignee: Insituform (Netherlands) BV, Rotterdam, Netherlands

[21] Appl. No.: 866,165

[22] PCT Filed: Jan. 16, 1991

[86] PCT No.: PCT/GB91/00060
§ 371 Date: Jun. 29, 1992
§ 102(e) Date: Jun. 29, 1992

[87] PCT Pub. No.: WO91/10555
PCT Pub. Date: Jul. 25, 1991

[30] Foreign Application Priority Data

Jan. 18, 1990 [GB] United Kingdom ............... 9001137

[51] Int. Cl.⁶ ..................... B29C 63/36; F16L 55/165
[52] U.S. Cl. ..................... 264/516; 264/36; 264/269; 156/287; 156/294
[58] Field of Search ............ 264/36, 516, 269; 156/287, 294; 138/97, 98

[56] References Cited

U.S. PATENT DOCUMENTS

| 4,009,063 | 2/1977 | Wood | 156/294 |
| 4,434,115 | 2/1984 | Chick | 264/36 |
| 4,602,974 | 7/1986 | Wood | 264/516 |
| 4,752,511 | 6/1988 | Driver | 264/269 |

FOREIGN PATENT DOCUMENTS

| 0082212 | 6/1983 | European Pat. Off. |
| 1340068 | 12/1971 | United Kingdom . |
| 1449455 | 9/1976 | United Kingdom . |

*Primary Examiner*—Mathieu D. Vargot
*Attorney, Agent, or Firm*—Lowe, Price, LeBlanc & Becker

[57] ABSTRACT

The method provides that a pipeline (10) or passageway (10) wall is coated using a backstop means, a body of resinous material (6) and an everting tube (5). These items are located inside the passageway to be lined and moved there along with the backstop (1) providing support for the bulk of resin material and also applying pressure via the resin material onto the everting face (16). When the everting tube is a resin absorbent material, the presence of the bulk of the fluent material prevents air from becoming entrained in the everting face and prevents voids in final lining. The resin may be introduced via a tee piece (12) through the lag thereof while the everting tube is introduced along the arms of the tee.

12 Claims, 2 Drawing Sheets

LINING OF PIPELINES OR PASSAGEWAYS

This invention relates to the lining of pipelines or passageways in which a synthetic composition is utilised either as an adhesive or to form in itself a layer which forms a coating on the pipeline or passageway surface. In specific examples, the coating material is a curable synthetic resin, which may be of the ambient cured type or maybe of a type which requires initiation for example by heat or light or other means to commence the cure.

BACKGROUND

Lining processes in which curable synthetic resin is used are known, and typical of such a process is described in British patent specification no. 1449455. As described in that patent specification, a lining process for an underground passageway such as a sewer involves the use of a flexible lining tube which comprises a resin absorbent inner layer such as a fibrous felt, and an impermeable outer layer. To insert the flexible tube into the pipeline or passageway to which the tube is sized, the tube is everted using fluid pressure, typically a head of .water. The resin impregnated fibrous inner layer is therefore turned inside out and is presented to the surface to be lined. When the lining tube has been applied fully, the resin soaking the absorbent layer is cured so that in fact the resin absorbent layer and the cured resin form a rigid lining shell or skin on the passageway surface. The impermeable membrane may serve as a surface to the finished tube, or it may alternatively be removed. This lining process is extremely successful and is used throughout the world and is in fact known as the Insituform (Registered trademark) process. The flexible lining tube comprising the inner fibrous layer and the outer impermeable layer is trademarked by the name Insitutube.

SUMMARY OF THE INVENTION

The present invention has specific application to processes involving the applying of Insitutubes to underground passageway surfaces, but varies in concept from the Insituform method described above.

In its widest aspect, the present invention comprises a method of lining a pipeline or passageway surface wherein a body of fluent synthetic resin is housed in the pipeline or passageway between an everting face of an inwardly travelling lining tube of resin absorbent material which is preimpregnated impregnated with synthetic resin to exclude air therefrom and a backstop means ensuring the creation of a pressure from the body of fluent material against the everting face, so that the everting face the bulk of fluent synthetic resin and the backstop move together along the surface to be lined. It is preferred that the backstop be a "rolling pig" which comprises a tubular member of a flexible material with the ends turned back on themselves and connected together. The pig is inflated and will roll upon itself as the coating proceeds along the passageway.

The everting tube preferably is an Insitutube comprising an inner fibrous absorbent layer and an outer impermeably membrane, in which case the invention has the significant advantage that a void free Insitupipe bonded or bendable to the original surface results. The method may comprise the provision of a launching tee piece located at the end of the pipeline or passageway and into which the body of the fluent composition can be loaded. The everting tube enters the tee from one arm and exits via the other arm directly into the pipeline or passageway moving the body of fluent material into the passageway as it progresses.

This method is particularly suitable for applying thick coatings to, for example, steel pipelines for the purposes of corrosion protection. It is particularly useful for drinking water pipes and will suitably replace the conventional lining method for such pipes which comprises the application of cement mortar. More recently such pipes have been lined by a spray on technique using epoxy resin, a process which has met with some success.

THE DRAWINGS

An embodiment of the present invention is illustrated by way of example only with reference to the accompanying drawings wherein;

FIG. 1 is a sectional side elevation showing the leading end of the pipeline or passageway to be lined; and FIG. 2 is a view showing the process after the rolling pig and everting face have moved somewhat along the passageway.

DESCRIPTION OF PREFERRED EMBODIMENTS

Figure 1:
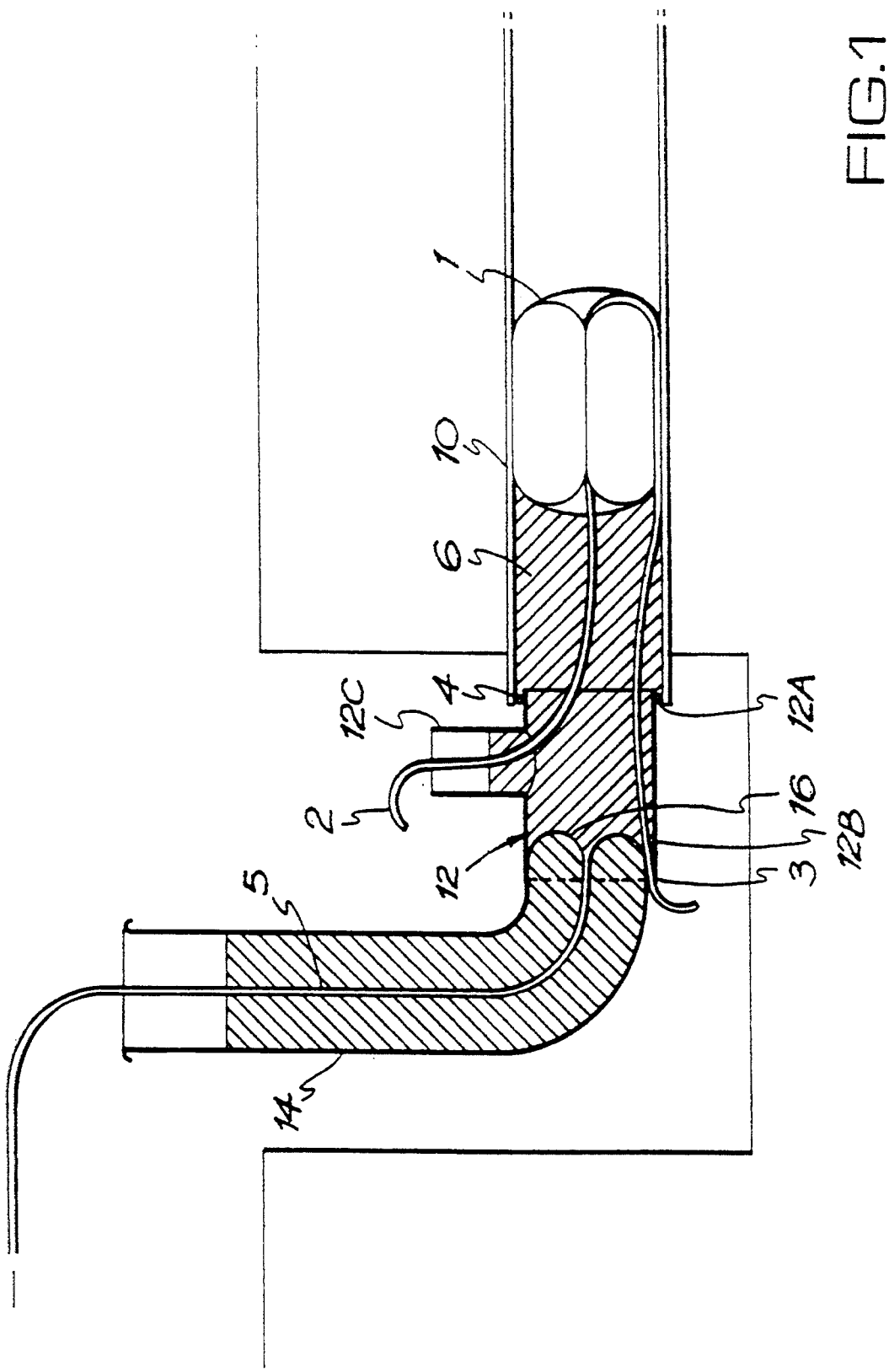
Figure 2:
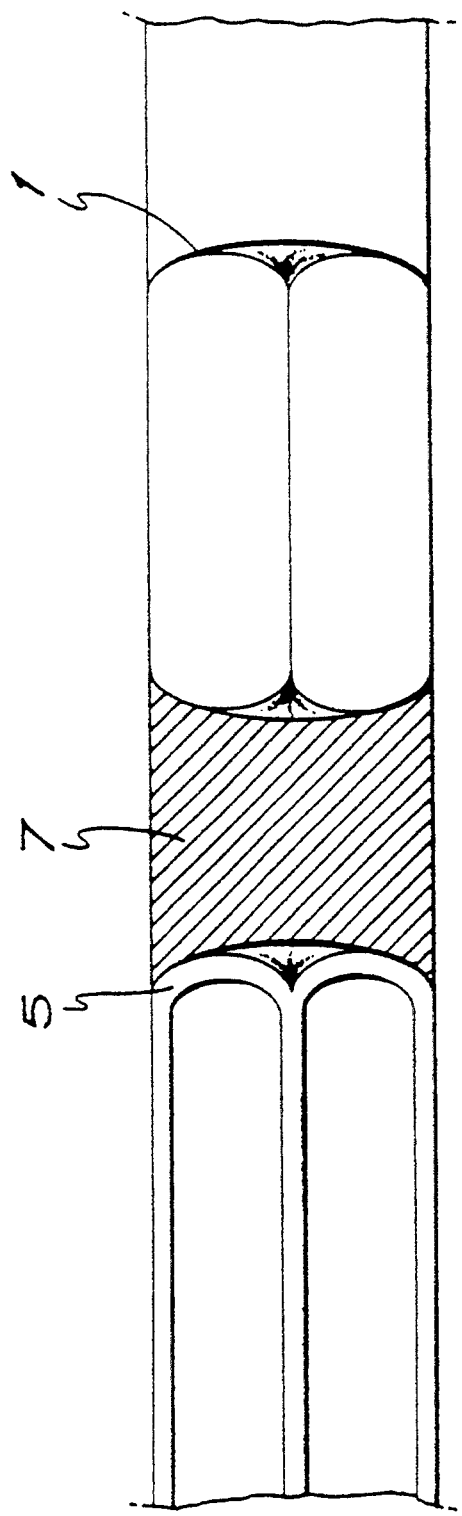

Referring to the drawings, a flexible lining tube (5) which typically will have an inner felt layer of no more than 3 mm in thickness, and an outer impermeable coating which may be removable at the end of the process. The felt is impregnated with resin prior to use and the ends are sealed. The pipeline (10) to be lined using the Insitutube is initially cleaned, and where the pipe is of metal, it is preferably cleaned back to the bare metal surface by any suitable cleaner device.

A launching tee piece (12) is fixed so that one arm (12a) is connected to the end of the pipe (10) whilst the other arm (12b) has a feed elbow (14) aligned therewith. The leg (12c) of the launching tee piece provides a means for charging curable synthetic resin into the tee piece and into the leading end of the passageway (10). The leg (12a) is sealed to the leading end of the pipe (10) by means of a temporary seal (4). Into the passageway (10) at the appropriate end is introduced a rolling pig (1). A rolling pig as described herein comprises a length of flexible tubing of which the ends are turned backwards upon the tube and are connected together so that the tube becomes endless and can roll upon itself as will be understood. The pig is in fact inflated by suitable inflation means through a one-way valve, and when it is inflated to the required pressure it will form a seal on the inner surface of the passageway (10). A tape or rope (2) passes through the centre of the pig, and out through the leg.(12c) as shown and forms a means for holding the pig back from travelling freely along the passageway (10). The tape or rope (2) passes to the outside of the pig, and is returned as shown to the outlet of arm (12b) of the launching tee piece as indicated by reference (3).

The Insitutube (5) is everted through the connecting elbow (14) using water as shown or alternatively air under pressure after the leading end of the tube (5) is turned back upon itself so that the water pressure will cause the tube to evert along the arms of the tee and into the passageway (10). An appropriate quantity of the resin (6) is introduced into the space between the pig and the everting face (16) of the tube (5) to completely fill such space and to displace any air therefrom. As the resin is poured in, the tape (2) is released by being fed out to allow the rolling pig to move down the pipeline to the appropriate position. The tube (5) is now everted, and before it closes the open end of the arm (12b) of the tee, any excess amount of the tape (2) is cut off so that it does not impede the progress of the pig along the passageway as will be explained.

As eversion continues the rolling pipe (1) will move ahead of the body of resin (6) holding said reservoir against the everting face and by this means the everting face constantly is in contact with the resin reservoir thereby providing the significant advantage of excluding the entry of air into such face and in particular into the fabric layer whereby voids in the resulting lining are avoided.

If the passageway (10) has any side connections then of course it is necessary to ensure that such side connections are blocked off before the process commences as otherwise such side connections would fill with resin as the body or reservoir of resin (6) passes. A simple method of achieving this block-off is to pre-line the passageway (10) with for example a flexible tube of synthetic plastics material, a procedural step which is quite simple.

When the pig reaches the downstream end of the pipeline, suitable arrangements can be made to catch the pig and any excess resin.

In an alternative arrangement, an ordinary pipe pig of any of the commercial forms e.g. a piston, plug or the like may be used although the use of such pigs gives a greater risk of the process being impeded due to the pigs sticking in the passageway. The rolling pig may be of a fabric reinforced rubber or plastics material.

It will be apprieciated that the Insitutube may be replaced by an alternative form of tube such as a standard, multi-layered structure, but in any case the method does achieve the prevention of air and water entrainment during eversion.

In the methods described, the resin may be of a type which is cured by curing means such as heat and/or light, but the invention can also be applied where the resin is of the ambient cured type.

I claim:

1. A method of lining the interior of a horizontal pipeline or passageway by everting into the pipeline or passageway from one end thereof, a lining tube comprising a resin absorbent material impregnated with synthetic resin, said method comprising the steps of
   (a) providing a terminating and filling coupling at said one end, said coupling comprising a hollow T-shaped body defining two arms and a leg, and being arranged so that one of said arms is sealingly connected to said one end of the pipeline or passageway and the leg extends upwardly;
   (b) positioning a movable backstop within the pipeline or passageway at said one end of said pipeline or passageway;
   (c) everting the leading end of the lining tube into the other arm of the coupling so that the resin impregnated everted face lies a spaced distance from and to the opposite side of the leg of the coupling from said backstop;
   (d) filling through said leg the space between said everting face and said back stop with a mass of curable fluid synthetic resin; and
   (e) thereafter everting said lining tube so that said mass of fluid resin and said backstop move along the pipeline or passageway and said lining tube progressively everts against the interior surface of said pipeline or passageway.

2. A method according to claim 1 wherein the backstop is a "rolling pig" which comprises a tubular member of flexible material with the ends turned back on themselves and connected together.

3. A method according to claim 2 wherein the pig is inflated so as to roll upon itself as the lining tube proceeds along the passageway.

4. A method according to claim 1 wherein the lining tube is a tube comprising an inner fibrous absorbent layer impregnated with the synthetic resin and an outer impermeable membrane.

5. A method according to claim 2 wherein the lining tube is a tube comprising an inner fibrous absorbent layer impregnated with the synthetic resin and an outer impermeable membrane.

6. A method according to claim 1 which includes providing said T-shaped body positioned at the end of the pipeline or passageway, causing the lining tube to enter the tee from one arm and exit via the other arm directly into the pipeline or passageway and moving the mass of synthetic resin into the passageway as it progresses.

7. A method according to claim 2 which includes providing said T-shaped body positioned at the end of the pipeline or passageway, causing the lining tube to enter the tee from one arm and exit via the other arm directly into the pipeline or passageway and moving the body of fluent synthetic resin into the passageway as it progresses.

8. A method according to claim 7 which includes passing a tape or rope through the inside of the pig to assist the movement of same along the pipeline or passageway.

9. The method according to claim 1 wherein the method is used on a steel pipeline for the purposes of corrosion protection.

10. The method according to claim 2 wherein the method is used on a steel pipeline for the purposes of corrosion protection.

11. A method according to claim 1 which includes applying a pre-lining tube to the pipeline or passageway before the insertion therein of the backstop means, the mass of synthetic resin and the lining tube.

12. A method according to claim 2 which includes applying a pre-lining tube to the pipeline or passageway before the insertion therein of the backstop means, the mass of synthetic resin and the lining tube.

* * * * *